(12) United States Patent
Yuba

(10) Patent No.: US 8,339,505 B2
(45) Date of Patent: Dec. 25, 2012

(54) ELECTRONIC CAMERA

(75) Inventor: Motohiro Yuba, Osaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 595 days.

(21) Appl. No.: 12/404,589

(22) Filed: Mar. 16, 2009

(65) Prior Publication Data

US 2009/0237552 A1 Sep. 24, 2009

(30) Foreign Application Priority Data

Mar. 22, 2008 (JP) .................................. 2008-74753

(51) Int. Cl.
*G03B 13/36* (2006.01)

(52) U.S. Cl. ....................................... 348/349; 396/128

(58) Field of Classification Search .................. 348/349; 396/125–128
See application file for complete search history.

(56) References Cited

U.S. PATENT DOCUMENTS

| | | | |
|---|---|---|---|
| 4,447,719 A | 5/1984 | Ogasawara | |
| 4,998,124 A | 3/1991 | Ishida et al. | |
| 5,212,513 A | 5/1993 | Ishida et al. | |
| 5,223,886 A | 6/1993 | Ishida et al. | |
| 5,408,291 A | 4/1995 | Ishida et al. | |
| 5,574,535 A * | 11/1996 | Ogasawara | 396/95 |
| 5,692,118 A | 11/1997 | Yasukawa | |
| 6,963,360 B1 * | 11/2005 | Esquibel et al. | 348/207.99 |
| 7,869,701 B1 * | 1/2011 | Tsai | 396/49 |
| 2004/0052514 A1 | 3/2004 | Hirai | |

FOREIGN PATENT DOCUMENTS

| | | |
|---|---|---|
| JP | 56-078811 A | 6/1981 |
| JP | 57-128307 A | 8/1982 |
| JP | 01-140109 A | 6/1989 |
| JP | 03-249714 A | 11/1991 |
| JP | 05-053045 A | 3/1993 |
| JP | 08-129129 A | 5/1996 |
| JP | 09-281382 A | 10/1997 |
| JP | 10-170815 A | 6/1998 |
| JP | 2004-102135 A | 4/2004 |
| JP | 2006-243744 A | 9/2006 |
| JP | 2007-299007 A | 11/2007 |

OTHER PUBLICATIONS

Japanese Office Action dated Mar. 27, 2012, issued in corresponding Japanese Patent Application No. 2008-074753.

* cited by examiner

*Primary Examiner* — Clayton E LaBalle
*Assistant Examiner* — Leon W Rhodes, Jr.
(74) *Attorney, Agent, or Firm* — Westerman, Hattori, Daniels & Adrian, LLP

(57) ABSTRACT

An electronic camera includes an imaging device. The imaging device has an imaging surface irradiated with an optical image of an object scene that undergoes a focus lens, and outputs an object scene image produced on the imaging surface. A CPU predicts a focus direction based on a focus position registered in a register when a shutter button is half-depressed. The CPU also changes a position of the focus lens by referencing a prediction result of the focus direction, and based on the object scene image outputted from the imaging device in parallel with this change process, adjusts the position of the focus lens to the focus position. The CPU further registers the adjusted position of the focus lens, as the focus position, into the register.

10 Claims, 8 Drawing Sheets

EA (A) FOCUS DIRECTION=NEAR DIRECTION (B) FOCUS DIRECTION=NEAR DIRECTION (C) FOCUS DIRECTION=INFINITE DIRECTION (A) ROUGH ADJUSTMENT OPERATION (B) FINE ADJUSTMENT OPERATION

ELECTRONIC CAMERA

CROSS REFERENCE OF RELATED APPLICATION

The disclosure of Japanese Patent Application No. 2008-74753, which was filed on Mar. 22, 2008 is incorporated herein by reference.

BACKGROUND OF THE INVENTION

1. Field of the Invention

The present invention relates to an electronic camera. More specifically, the present invention relates to an electronic camera that adjusts a distance from an optical lens to an imaging surface to a distance corresponding to a focal point.

2. Description of the Related Art

According to one example of this type of a camera, a drive amount of a focus lens required for eliminating defocusing is calculated repeatedly based on an image signal fetched repeatedly from a photoelectric conversion portion. Furthermore, a drive speed of the focus lens is calculated based on the calculated drive amount and a fetching time of the image signal. The focus lens is moved in a direction according to the calculated drive amount at the calculated drive speed. This improves an ability to follow a moving object. However, a so-called one-shot AF is not assumed in the above-described camera, and thus, there is a limit to the improvement in performance.

SUMMARY OF THE INVENTION

An electronic camera according to the present invention, comprises: an imager, having an imaging surface irradiated with an optical image of an object scene that undergoes an optical lens, for outputting an object scene image produced on the imaging surface; a predictor for predicting a focus direction based on distance information registered in a storage when receiving a focus adjustment instruction; a changer for changing a distance from the optical lens to the imaging surface by referencing a prediction result of the predictor; an adjustor for adjusting the distance from the optical lens to the imaging surface to a distance corresponding to a focal point, based on the object scene image outputted from the imager after a change process of the changer; and a register for registering distance information indicating the distance adjusted by the adjuster in a storage.

Preferably, the predictor includes a regularity determiner for determining whether or not the distance indicated by the distance information registered in the storage has a predetermined regularity, and a prediction executer for executing a direction predicting process in a manner different depending on a determination result of the regularity determiner.

More preferably, the prediction executor includes: a first focus-direction predictor for predicting a focus direction according to the regularity when a determination result of the regularity determiner is positive; a first detector for detecting the number of distances longer than a current distance from among distances indicated by the distance information registered in the storage when the determination result of the regularity determiner is negative; a second detector for detecting the number of distances shorter than the current distance from among the distances indicated by the distance information registered in the storage in association with a detecting process of the first detector; and a second focus-direction predictor for predicting the focus direction based on a detection result of the first detector and a detection result of the second detector.

Preferably, further comprised are: an adequacy determiner for determining an adequacy of a prediction result of the predictor based on the object scene image outputted from the imager in parallel with a change process of the changer; and a reverter for reverting a change direction of the changer according to a determination result of the adequacy determiner.

According to the present invention, a focus control program product executed by a processor of an electronic camera provided with an imager, having an imaging surface irradiated with an optical image of an object scene that undergoes an optical lens, for outputting an object scene image produced on the imaging surface, the focus control program product comprises: a predicting step of predicting a focus direction based on distance information registered in a storage when receiving a focus adjustment instruction; a changing step of changing a distance from the optical lens to the imaging surface by referencing a prediction result of the predicting step; an adjusting step of adjusting the distance from the optical lens to the imaging surface to a distance corresponding to a focal point, based on the object scene image outputted from the imager after a change process in the changing step; and a registering step of registering the distance information indicting the distance adjusted by the adjusting step into the storage.

According to the present invention, a focus control method executed by an electronic camera provided with an imager, having an imaging surface irradiated with an optical image of an object scene that undergoes an optical lens, for outputting an object scene image produced on the imaging surface, the focus control method comprises: a predicting step of predicting a focus direction based on distance information registered in a storage when receiving a focus adjustment instruction; a changing step of changing a distance from the optical lens to the imaging surface by referencing a prediction result of the predicting step; an adjusting step of adjusting the distance from the optical lens to the imaging surface to a distance corresponding to a focal point, based on the object scene image outputted from the imager after a change process in the changing step; and a registering step of registering the distance information indicating the distance adjusted by the adjusting step into the storage.

The above described features and advantages of the present invention will become more apparent from the following detailed description of the embodiment when taken in conjunction with the accompanying drawings.

DETAILED DESCRIPTION OF THE PREFERRED EMBODIMENTS

Figure 1:
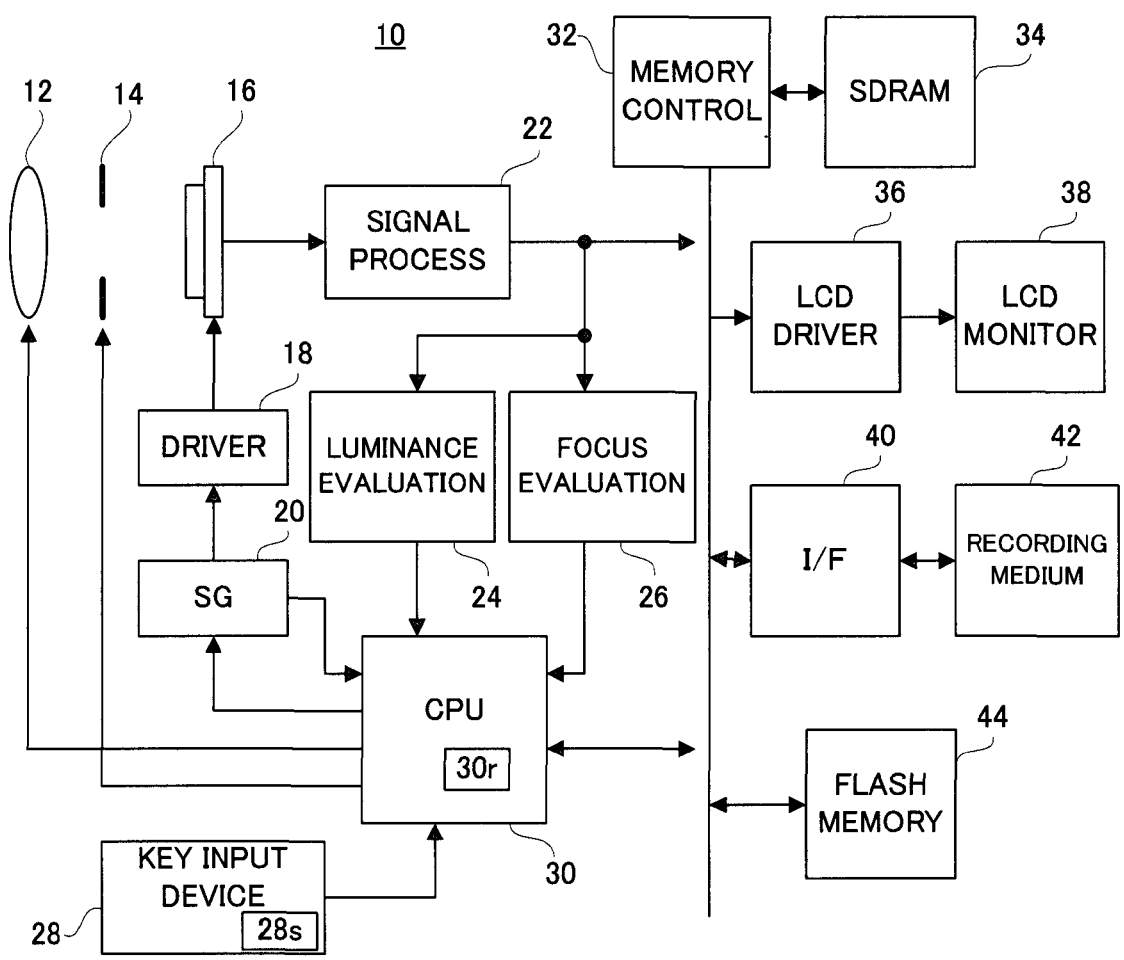
FIG. 1 is a block diagram showing a configuration of one embodiment of the present invention.

With reference to FIG. 1, a digital camera 10 according to this embodiment includes a focus lens 12 and an aperture unit 14. An optical image of an object scene that undergoes these components is irradiated onto an imaging surface of an imaging device 16, and subjected to photoelectric conversion. Thereby, electric charges representing the object scene image are produced.

When a power supply is inputted, a CPU 30 places the focus lens 12 at an infinite end, and also commands a driver 18 to repeat a pre-exposure operation and a thinning-out reading-out operation in order to execute a through-image process. In response to a vertical synchronization signal Vsync generated cyclically from an SG (Signal Generator) 20, the driver 18 performs a pre-exposure on the imaging surface, and reads out the electric charges produced on the imaging surface in a thinning-out manner. From the imaging device 16, low-resolution raw image data based on the read-out electric charges is cyclically outputted in a raster scanning manner.

A signal-processing circuit 22 performs processes, such as white balance adjustment, color separation, and YUV conversion, on the raw image data outputted from the imaging device 16, and writes image data of a YUV format created thereby into an SDRAM 34 through a memory control circuit 32. An LCD driver 36 repeatedly reads out the image data accommodated in the SDRAM 34 through the memory control circuit 32, and drives an LCD monitor 38 based on the read-out image data. As a result, a real-time moving image (through image) of the object scene is displayed on a monitor screen.

Figures 2, 3:
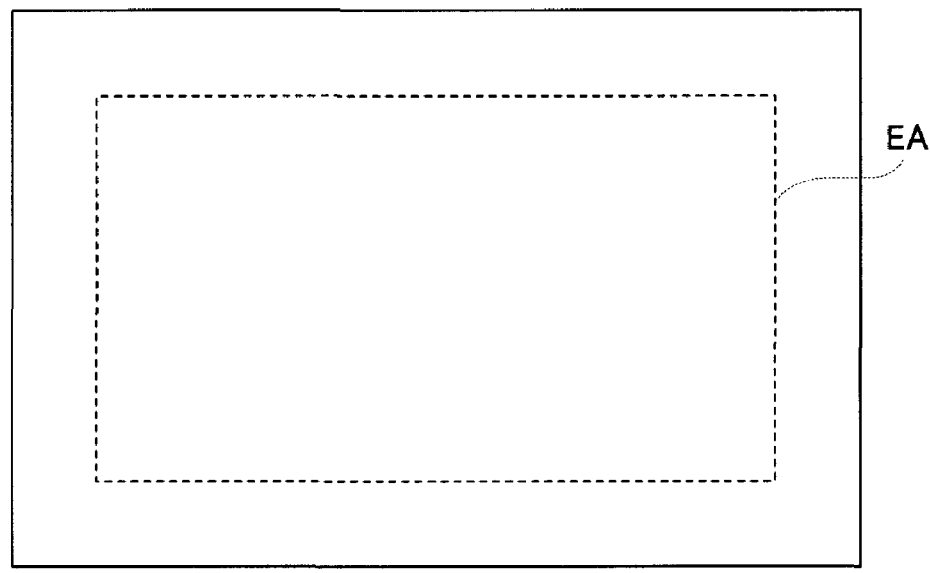
FIG. 2 is an illustrative view showing one example of an allocation state of an evaluation area in an imaging surface.
FIG. 3 is an illustrative view showing one example of a configuration of a register applied to the embodiment in FIG. 1.

With reference to FIG. 2, an evaluation area EA is allocated to the center of the imaging surface. A luminance evaluation circuit 24 integrates Y data belonging to the evaluation area EA, out of Y data outputted from the signal processing circuit 22, each time the vertical synchronization signal Vsync is generated. An integral value, i.e., a luminance evaluation value, is outputted from the luminance evaluation circuit 24 in a generation cycle of the vertical synchronization signal Vsync. The CPU 30 repeatedly executes an AE process (simple AE process) for a through image in parallel with the above-described through-image process, in order to calculate an appropriate EV value based on the luminance evaluation value outputted from the luminance evaluation circuit 24. An aperture amount and an exposure time period, which define the calculated appropriate EV value, are respectively set to the aperture unit 14 and the driver 18. As a result, the brightness of the through image displayed on the LCD monitor 38 is moderately adjusted.

When a shutter button 28s on a key input device 28 is half-depressed, a strict AE process for recording is executed in order to calculate an optimal EV value based on the luminance evaluation value outputted from the luminance evaluation circuit 24. An aperture amount and an exposure time period, which define the calculated optimal EV value, are respectively set to the aperture unit 14 and the driver 18 similar to the above-described case.

Upon completion of the AE process for recording, a one-shot AF process based on output of a focus evaluation circuit 26 is executed. A focus evaluation circuit 26 integrates a high-frequency component of the Y data belonging to the evaluation area EA shown in FIG. 2, out of the Y data outputted from the signal processing circuit 22, each time the vertical synchronization signal Vsync is generated. An integral value, i.e., an AF evaluation value, is outputted from the focus evaluation circuit 26 in a generation cycle of the vertical synchronization signal Vsync.

The CPU 30 fetches the AF evaluation value from the focus evaluation circuit 26 so as to search a focus position(=focal point) by a so-called hill-climbing process. Each time the vertical synchronization signal Vsync is generated, the focus lens 12 is moved stepwise in an optical-axis direction, and placed at a detected focus position.

When the shutter button 28s is fully depressed, a recording process is executed. The CPU 30 commands the driver 18 to execute a main exposure operation and all-pixel reading, one time each. The driver 18 performs the main exposure on the imaging surface in response to the generation of the vertical synchronization signal Vsync, and reads out all electric charges produced on the imaging surface in a raster scanning manner. As a result, high-resolution raw image data representing an object scene is outputted from the imaging device 16.

The outputted raw image data is subjected to a process similar to that described above, and as a result, high-resolution image data according to a YUV format is secured in the SDRAM 34. An I/F 40 reads out the high-resolution image data thus accommodated in the SDRAM 34 through the memory control circuit 32, and then, records the read-out image data on a recording medium 42 in a file format. It is noted that the through-image process is resumed at a time point when the high-resolution image data is accommodated in the SDRAM 34.

The one-shot AF process is executed according to a procedure described below. Firstly, a direction toward the focus position from a current position of the focus lens 12, i.e., a focus direction, is predicted by referencing a volatile register 30r shown in FIG. 3. According to FIG. 3, the register 30r has 10 columns, and the focus positions detected after a power supply is inputted are registered in these columns cyclically.

Figure 4:
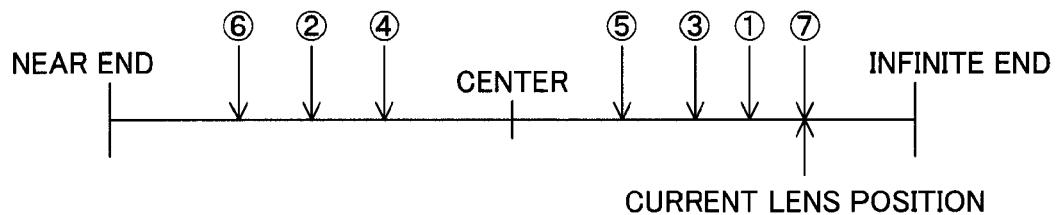
FIG. 4(A) is an illustrative view showing one example of a moving-direction predicting process.
FIG. 4(B) is an illustrative view showing another example of the moving-direction predicting process.
FIG. 4(C) is an illustrative view showing still another example of the moving-direction predicting process.
Figure 4:
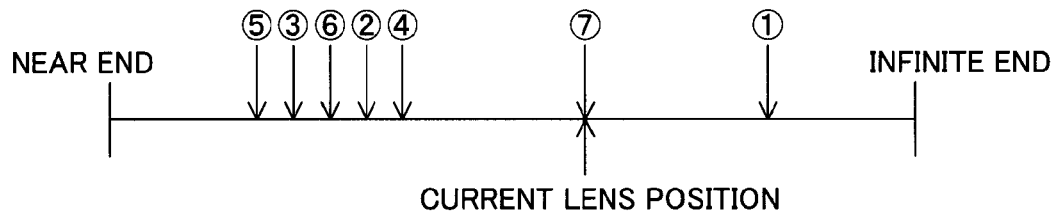
Figure 4:
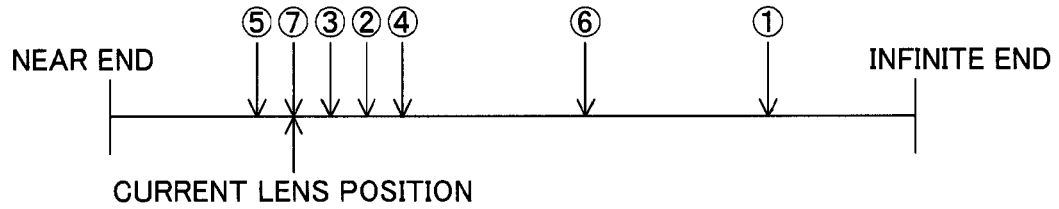

When a plurality of focus positions are registered in the register 30r, a manner in which these focus positions are changed is verified. When the focus positions registered in the register 30r change alternately between a position on an infinite side from the center and a position on a near side from the center, as shown in FIG. 4(A), it is regarded that there is a predetermined regularity for the change in the focus position, and the focus direction is predicted according to this regularity. When a focus position of last time, i.e., a current position of the focus lens 12 is at a position on the infinite side from the center, it is predicted that a near direction is the focus direction. On the other hand, when the current position of the focus lens 12 is a center position or a position on the near side from the center, it is predicted that an infinite direction is the focus direction.

When the predetermined regularity is not found from the manner in which the focus position is changed, the number of focus positions on the near side from the current position of the focus lens 12 and the number of focus positions on the infinite side from the current position of the focus lens 12 are detected from the register 30r, and the focus direction is predicted based on two detected numerical values. That is, as shown in FIG. 4(B), when the number of focus positions on the near side from the current position is equal to or more than the number of focus positions on the infinite side from the current position, it is predicted that the near direction is the focus direction. On the other hand, as shown in FIG. 4(C), when the number of focus positions on the near side from the current position falls below the number of focus positions on the infinite side from the current position, it is predicted that the infinite direction is the focus direction.

When the number of focus positions registered in the register 30r is "0" or "1", the focus direction is predicted in consideration of the position of the focus lens 12. That is, when the current position of the focus lens 12 is at a position on the infinite side from the center, it is predicted that the near direction is the focus direction. On the other hand, when the current position of the focus lens 12 is the center position or the position on the near side from the center, it is predicted that the infinite direction is the focus direction.

It is noted that at a time point of an initial AF process after the power supply is inputted, no focus position is registered in the register 30r, and the focus lens 12 is placed at the infinite end. At this point, it is predicted that the near direction is the focus direction.

Figure 5:
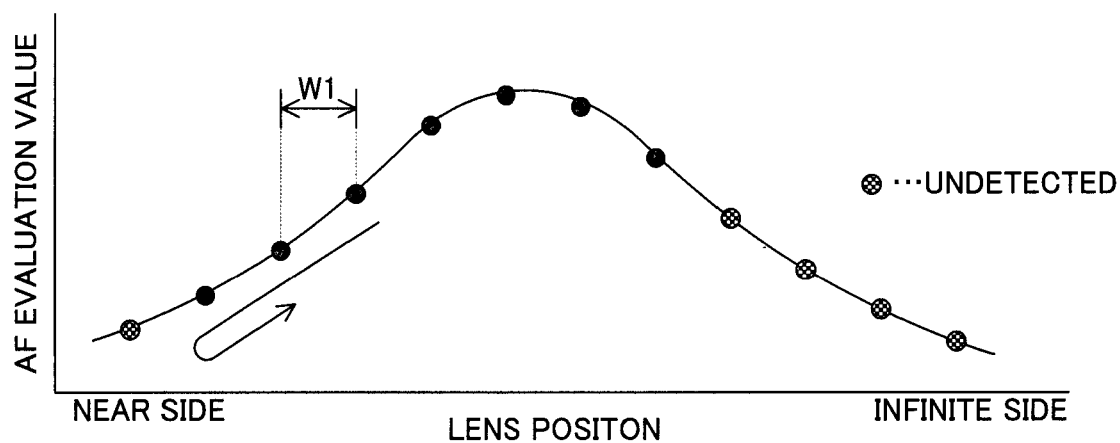
FIG. 5(A) is an illustrative view showing one example of a rough adjustment operation.
FIG. 5(B) is an illustrative view showing one example of a fine adjustment operation.
Figure 5:
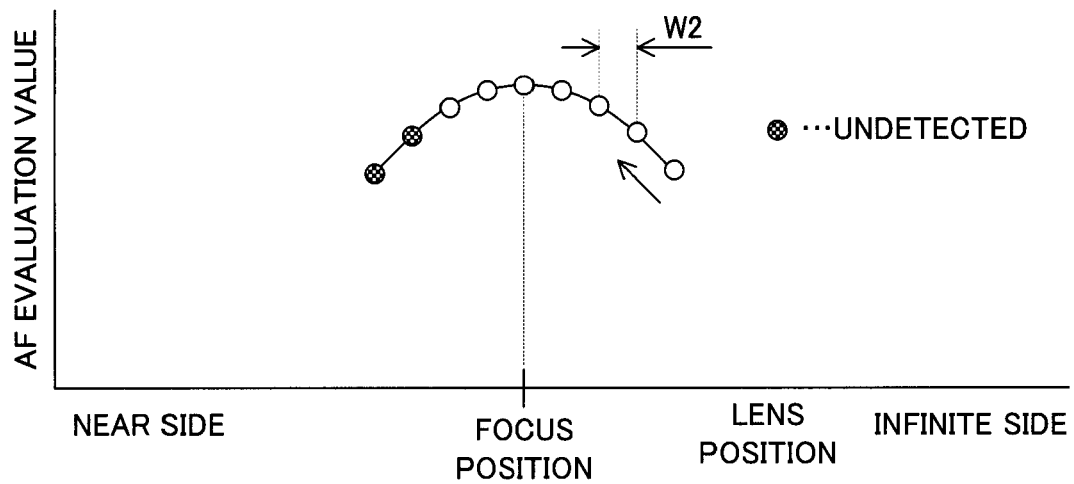
Figure 6:
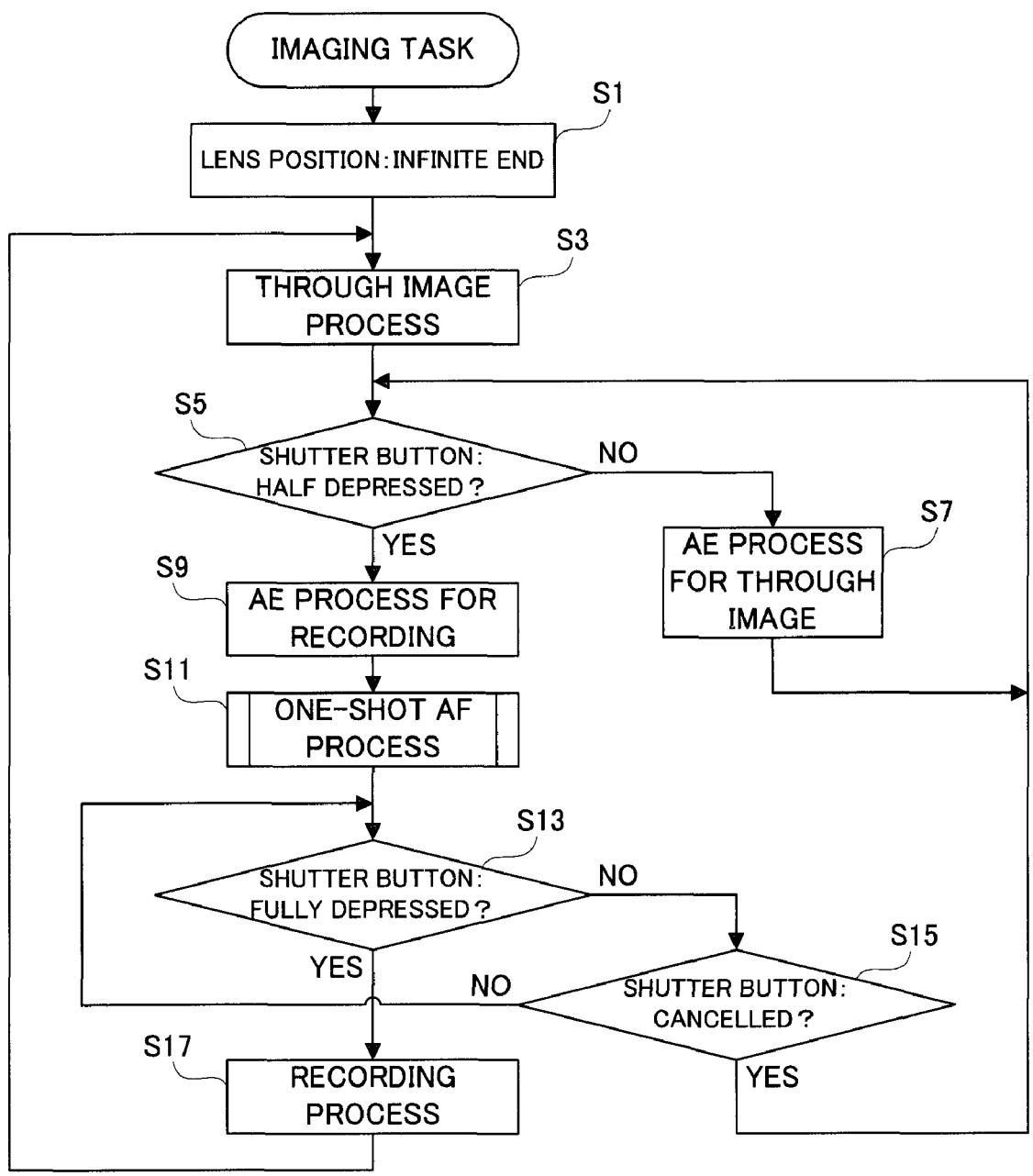
FIG. 6 is a flowchart showing one example of an operation of a CPU applied to the embodiment in FIG. 1.

Upon completion of such a focus-direction predicting process, a rough adjustment operation is executed according to a procedure shown in FIG. 5(A). The focus lens 12 is moved by each moving amount W1 in the predicted focus direction. The CPU 28 fetches the AF evaluation values outputted repeatedly from the focus evaluation circuit 26 in parallel with such a rough adjustment operation. When the AF evaluation value fetched this time exceeds the AF evaluation values fetched until the last time, the AF evaluation value fetched this time is saved as a maximum AF evaluation value.

When the AF evaluation value reduces for two consecutive times while the maximum AF evaluation value is left undetected, it is regarded that there is an error in the prediction of the focus direction, and the moving direction of the focus lens 12 is reversed. The focus lens 12 is moved by each moving amount W1 in an opposite direction. When the AF evaluation value fetched after the detection of the maximum AF evaluation value falls below the maximum AF evaluation value for two consecutive times, it is determined that the focus lens 12 moves past the focus position. Thereby, the rough adjustment operation is ended, and a fine adjustment operation is started.

With reference to FIG. 5(B), the focus lens 12 is moved in a direction opposite to the moving direction until this time by each moving amount W2 that is smaller than the moving amount W1. Similar to the case described above, the focus evaluation circuit 26 repeatedly outputs the AF evaluation value in parallel with the fine adjustment operation. Also in the fine adjustment operation, the AF evaluation value exceeding the AF evaluation values fetched until the last time is saved as the maximum AF evaluation value. When the AF evaluation value fetched thereafter falls below the maximum AF evaluation value for two consecutive times, the focus lens 12 is regarded to move past the focus position, and the position corresponding to the maximum AF evaluation value is determined as the focus position. The determined focus position is registered in the register 30r, and the focus lens 12 is placed at the determined focus position.

The CPU 30 executes a process according to an imaging task shown in FIG. 6 to FIG. 9. A control program corresponding to the imaging task is stored in a flash memory 44.

Firstly, the focus lens 12 is placed at the infinite end in a step S1, and the through-image process is executed in a step S3. As a result of the through-image process, a through image that represents an object scene is outputted from the LCD monitor 38. In a step S5, it is determined whether or not the shutter button 28s is half-depressed, and as long as the determination result indicates NO, the AE process for a through image in a step S7 is repeated. As a result, the brightness of the through image is adjusted moderately. When the shutter button 28s is half-depressed, the AE process for recording is executed in a step S9, and the AF process is executed in a step S11. By the process in the step S9, the brightness of the through image is adjusted to an optimum value, and by the process in the step S11, the focus lens 12 is placed at the focus position.

In a step S13, it is determined whether or not the shutter button 28s is fully depressed, and in a step S15, it is determined whether or not the operation of the shutter button 28s is cancelled. When YES is determined in the step S13, the process returns to the step S3 after undergoing a recording process in a step S17. When YES is determined in the step S15, the process returns to the step S3 as it is.

Figure 7:
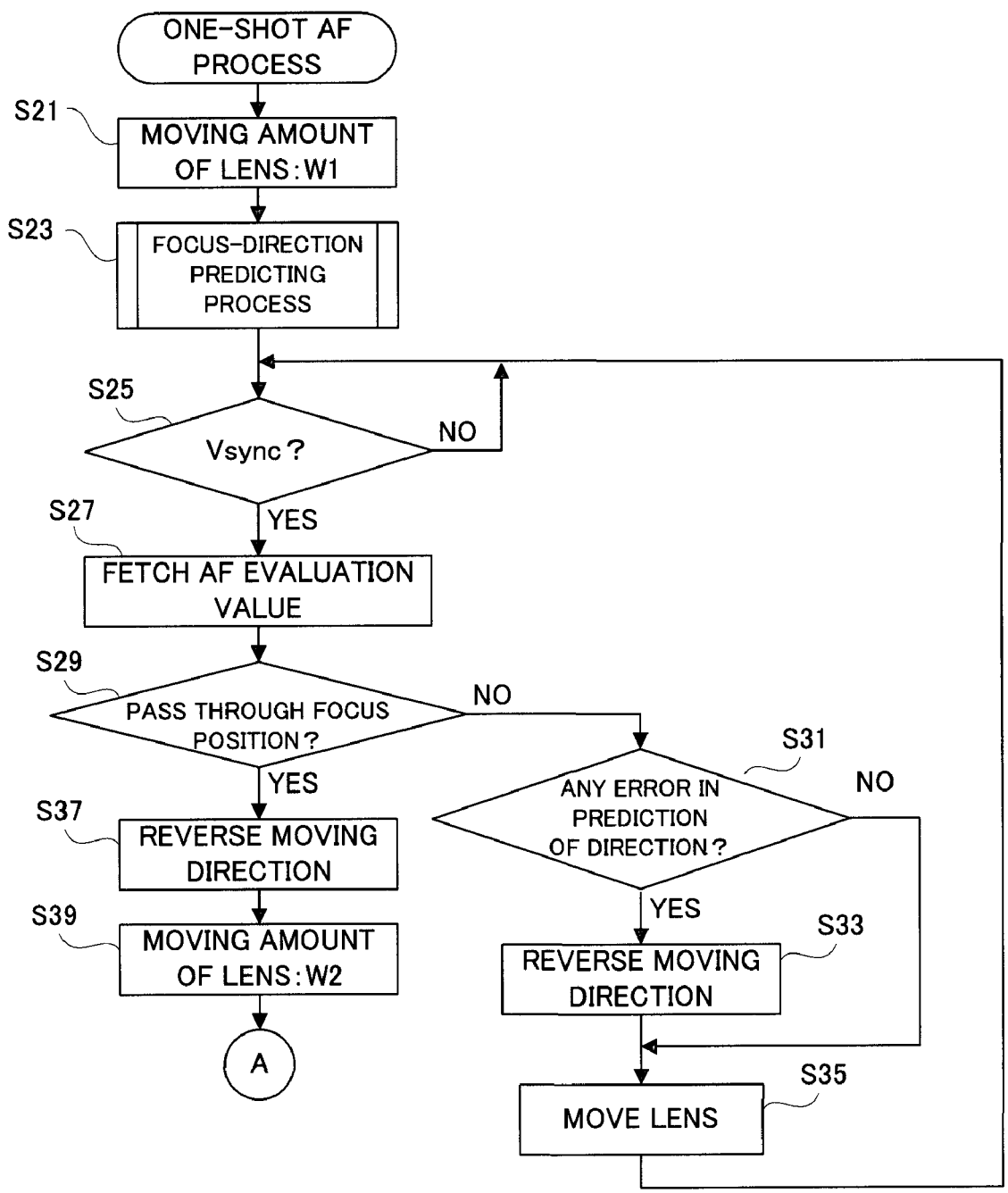
FIG. 7 is a flowchart showing another example of the operation of the CPU applied to the embodiment in FIG. 1.
Figure 8:
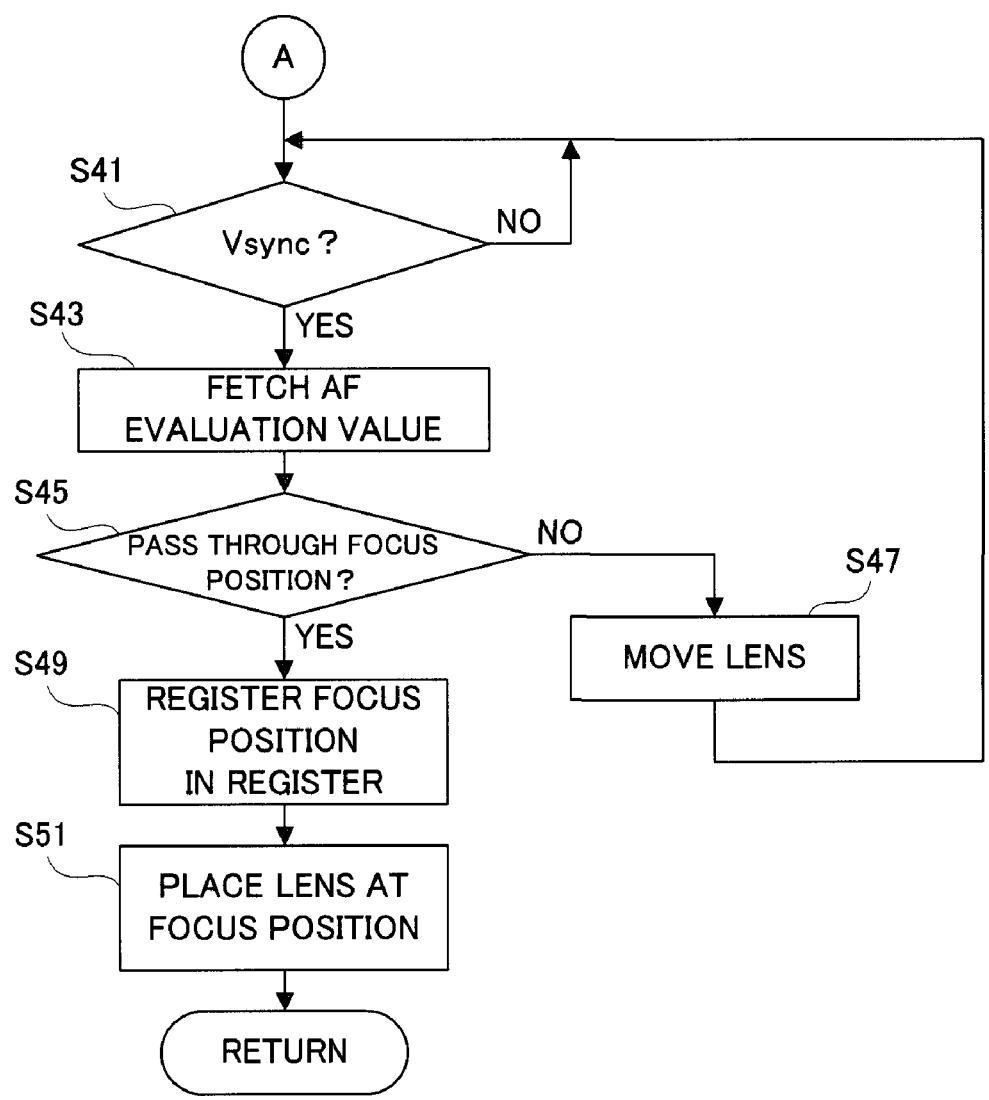
FIG. 8 is a flowchart showing still another example of the operation of the CPU applied to the embodiment in FIG. 1.
Figure 9:
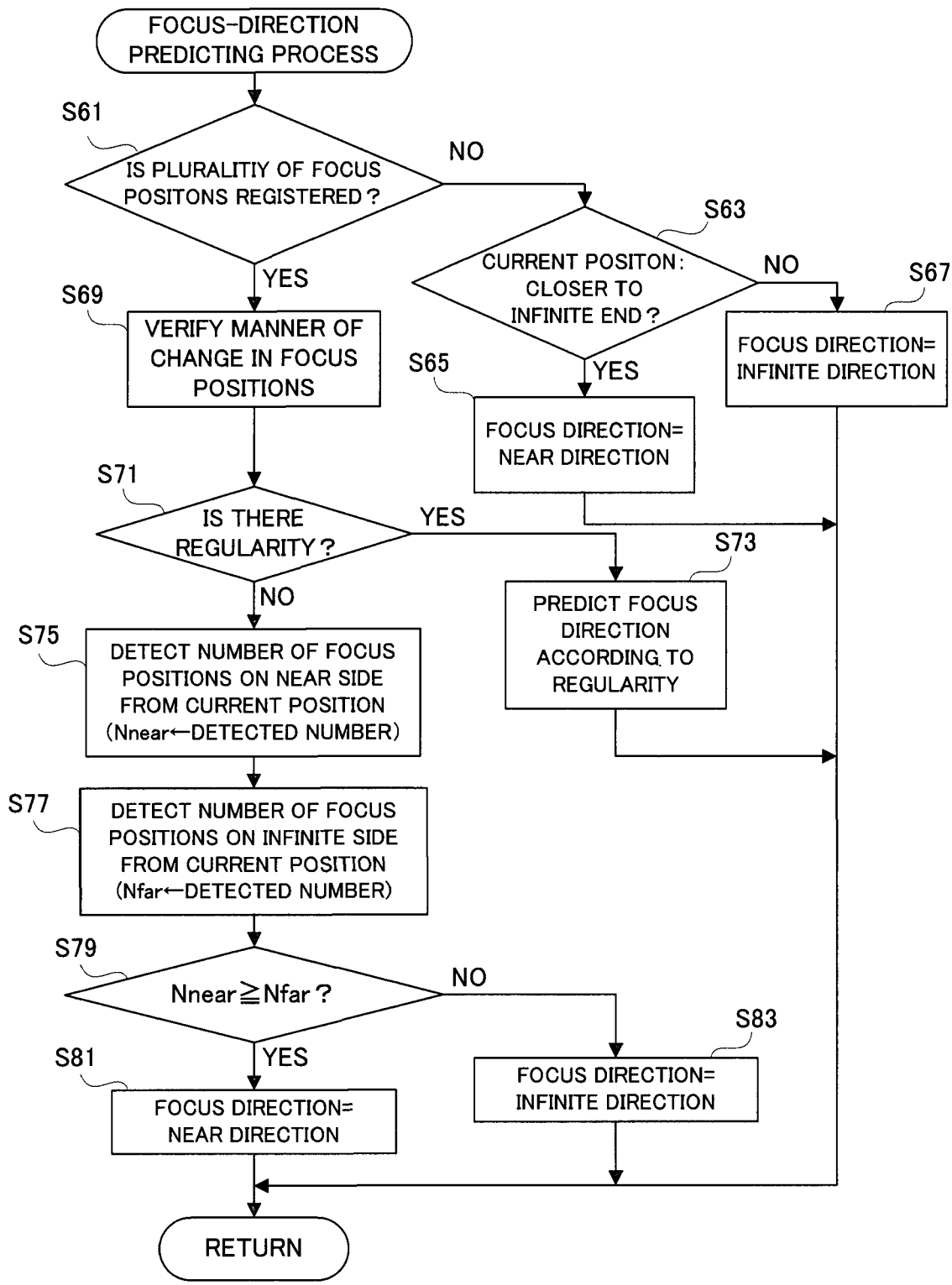
FIG. 9 is a flowchart showing yet still another example of the operation of the CPU applied to the embodiment in FIG. 1.

The AF process in the step S11 is executed according to a subroutine shown in FIG. 7 to FIG. 9. Firstly, to perform the rough adjustment operation, the moving amount of the focus lens 12 is set to "W1" in a step S21, and the focus-direction predicting process is executed in a step S23. The focus direction is predicted by the focus-direction predicting process, and the predicted focus direction is the moving direction of the focus lens 12.

When the vertical synchronization signal Vsync is generated, YES is determined in a step S25, and the AF evaluation value is fetched from the focus evaluation circuit 26 in a step S27. In a step S29, it is determined whether or not the focus position is passed through based on the AF evaluation value fetched in the step S27. In a step S31, it is determined whether or not there is any error in the prediction of the focus direction based on the AF evaluation value fetched in the step S27. Specifically, the step S29 corresponds to a process for determining whether or not the AF evaluation value falls below the maximum AF evaluation value for two consecutive times, and the step S31 corresponds to a process for determining whether or not the AF evaluation value reduces for two consecutive times while the maximum AF evaluation value is left undetected.

When NOs are determined in both the steps S29 and S31, the focus lens 12 is moved by the moving amount W1 in a step S35, and thereafter, the process returns to the step S25. When NO is determined in the step S29 and YES is determined in the step S31, the moving direction of the focus lens 12 is reversed in a step S33, and thereafter, the focus lens 12 is moved by the moving amount W1 in the step S35, and then, the process returns to the step S25.

When YES is determined in the step S29, in order to start the fine adjustment operation, the moving direction of the focus lens 12 is reversed in a step S37, and the moving amount of the focus lens 12 is set to "W2" in a step S39. When the vertical synchronization signal Vsync is generated, YES is determined in a step S41, and the AF evaluation value is fetched from the focus evaluation circuit 26 in a step S43. In a step S45, it is determined whether or not the focus position is passed through according to the same procedure as that in the step S29. When NO is determined in this step, the focus lens 12 is moved by the moving amount W2 in a step S47, and thereafter, the process returns to the step S41. When YES is determined in the step S45, the process proceeds to a step S49 in which a position corresponding to the maximum AF evaluation value is registered in the register 30r as the focus position. In a step S51, the focus lens 12 is placed at the registered focus position, and thereafter, the process is restored to a routine of the upper hierarchical level.

The focus-direction predicting process in the step S23 shown in FIG. 7 is executed according to a sub-routine shown in FIG. 9. Firstly, it is determined in a step S61 whether or not a plurality of focus positions are registered in the register 30r. When the number of focus positions registered in the register 30r is "0" or "1", it is determined in a step S63 whether or not the current position of the focus lens 12 is closer to the infinite end. When YES is determined in this step, it is predicted in a step S65 that the near direction is the focus direction while when NO is determined, it is predicted in a step S67 that the infinite direction is the focus direction. Upon completion of the process in the step S65 or S67, the process is restored to the routine of the upper hierarchical level.

When the number of focus positions registered in the register 30r is equal to or more than "2", the manner in which the focus position is changed is verified in a step S69, and it is determined in a step S71 whether or not the verified change manner has a predetermined regularity. When YES is determined in this step, the process proceeds to a step S73 so as to predict the focus direction according to the predetermined regularity. Thereby, the direction opposite to the focus direction predicted last time is predicted as the focus direction of this time. Upon completion of the prediction, the process is restored to the routine of the upper hierarchical level.

When NO is determined in the step S71, the process proceeds to processes from a step S75 onwards. In the step S75, the focus positions on the near side from the current position of the focus lens 12 are detected from the register 30r, and the number of detected focus positions is set to a variable Nnear. In a step S77, the focus positions on the infinite side from the current position of the focus lens 12 are detected from the register 30r, and the number of detected focus positions is set to a variable Nfar.

In a step S79, it is determined whether or not the variable Nnear is equal to or more than the variable Nfar, and when YES is determined, the process proceeds to a step S81 while NO is determined, the process proceeds to a step S83. In the step S81, the near direction is predicted to be the focus direction, and in the step S83, the infinite direction is predicted to be the focus direction. Upon completion of the process in the step S81 or S83, the process is restored to the routine of the upper hierarchical level.

As understood from the above description, the imaging device 16 has an imaging surface irradiated with an optical image of an object scene that undergoes the focus lens 12, and outputs an object scene image generated on the imaging surface. When the shutter button 28s is half-depressed (when a focus adjustment instruction is received), the CPU 30 predicts the focus direction based on the focus positions (distance information) registered in the register 30r (S23). The CPU 30 also changes the position of the focus lens 12 by referencing the prediction result of the focus direction (S35, S37, and S47), and adjusts the position of the focus lens 12 to the focus position based on the object scene image outputted from the imaging device 16 after the predicting process of the focus direction (S51). The CPU 30 further registers, as the focus position, the adjusted position of the focus lens 12 in the register 30r (S49).

Thus, the position of the focus lens 12 is adjusted to the focus position each time the shutter button 28s is half-depressed. The adjusted positions are accumulated in the register 30r as the past focus positions. The moving direction of the focus lens 12 in response to the half-depressing of the shutter button 28s, i.e., the focus direction, is predicted based on the focus positions accumulated in the register 30r. Thereby, a behavior of a photographer is reflected in a focusing operation, and thus, the performance of the one-shot AF is improved.

It is noted that in the embodiment, the focus lens 12 is moved in the optical-axis direction to adjust the distance from the focus lens 12 to the imaging surface. It may be possible that instead of the focus lens 12, or together with the focus lens 12, the imaging surface is moved in the optical-axis direction. When only the imaging surface is moved in the optical-axis direction, the "focus direction" means a direction from the current position of the imaging surface towards the focus position. When both the focus lens 12 and the imaging surface are moved in the optical-axis direction, the "focus direction" means a direction from a current distance between the focus lens 12 and the imaging surface, towards a distance between the focus lens 12 and the imaging surface corresponding to the focus position.

Furthermore, in this embodiment, the regularity in which the focus positions registered in the register 30r change alternately between the position on the infinite side from the center and the position on the near side from the center is defined as the "predetermined regularity". However, a regularity in which a movement start direction of the focus lens 12 in response to the half-depressing of the shutter button 28s is switched alternately between the infinite direction and the near direction may also be defined as the "predetermined regularity". In this case, whether or not there is the "predetermined regularity" is determined by noticing a difference between the focus positions registered in the adjacent columns of the register 30r, and the movement start direction of this time is set to a direction opposite to the movement start direction of last time.

Furthermore, in this embodiment, the focus lens 12 is continuously stopped during the period of the through-image process. However, the focus lens 12 may also be made to move continuously during the period of the through-image process by a continuous AF process. In this case, there is no guarantee that the current position of the focus lens 12 matches the focus position of last time. Therefore, preferably, it is determined in the step S61 whether or not at least one focus position is registered in the register 30r, and the number of focus positions that are the same as the current position, or that lie on the near side from the current position is detected in the step S75.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera, comprising:
an imager, having an imaging surface irradiated with an optical image that undergoes an optical lens, which outputs an electronic image corresponding to the optical image;
a predictor which predicts a focus direction in a manner depending on whether or not a distance indicated by distance information registered in a storage has a regularity, when receiving a focus adjustment operation from an operator;
an adjustor which adjusts the distance from said optical lens to said imaging surface to a distance corresponding to a focal point, based on the electronic image outputted from said imager and a prediction result of said predictor and a register which registers distance information indicating the distance adjusted by said adjustor into said storage.

2. An electronic camera according to claim 1, wherein said predictor includes:
   a first focus-direction predictor which predicts the focus direction according to the regularity when the distance has the regularity;
   a first detector which detects the number of distances longer than a current distance from among distances indicated by the distance information registered in said storage when the distance does not have the regularity;
   a second detector which detects the number of distances shorter than the current distance from among the distances indicated by the distance information registered in said storage in association with a detecting process of said first detector; and
   a second focus-direction predictor which predicts the focus direction based on a detection result of said first detector and a detection result of said second detector.

3. An electronic camera according to claim 1,
   wherein said adjuster includes a resetter which determines an adequacy of the prediction result based on the electronic image so as to reset a change direction.

4. A computer program embodied on a non-transitory computer-readable medium in order to control an electronic camera provided with an imager, having an imaging surface irradiated with an optical image that undergoes an optical lens, which outputs an electronic image corresponding to the optical image, said computer program causes a processor of said electronic camera to perform the following steps:
   a predicting step of predicting a focus direction in a manner depending on whether or not a distance indicated by distance information registered in a storage has a regularity, when receiving a focus adjustment operation from an operator;
   an adjusting step of adjusting the distance from said optical lens to said imaging surface to a distance corresponding to a focal point, based on the electronic image outputted from said imager and a prediction result of said predicting step; and
   a registering step of registering the distance information indicating the distance adjusted by said adjusting step into said storage.

5. A focus control method executed by an electronic camera provided with an imager, having an imaging surface irradiated with an optical image that undergoes an optical lens, which outputs an electronic image corresponding to the optical image, said focus control method comprising:
   a predicting step of predicting a focus direction in a manner depending on whether or not a distance indicated by distance information registered in a storage has a regularity, when receiving a focus adjustment operation from an operator;
   an adjusting step of adjusting the distance from said optical lens to said imaging surface to a distance corresponding to a focal point, based on the electronic image outputted from said imager and a prediction result of said predicting step; and
   a registering step of registering the distance information indicating the distance adjusted by said adjusting step into said storage.

6. An electronic camera according to claim 1, further comprising a recorder which records the electronic image output from said imager when receiving a recording operation from the operator.

7. An electronic camera, comprising:
   an imager, having an imaging surface irradiated with an optical image that undergoes an optical lens, which outputs an electronic image corresponding to the optical image:
   a predictor which predicts a focus direction based on distance information registered in a storage when receiving a focus adjustment operation from an operator;
   an adjuster which adjusts the distance from said optical lens to said imaging surface to a distance corresponding to a focal point, based on the electronic image outputted from said imager and a prediction result of said predictor; and
   a register which registers distance information indicating the distance adjusted by said adjustor into said storage, wherein said adjuster includes a resetter which determines an adequacy of the prediction result based on the electronic image so as to reset a change direction.

8. An electronic camera according to claim 7, wherein said predictor predicts the focus direction in a manner depending on whether or not a distance indicated by the distance information has a regularity.

9. A computer program embodied on a non-transitory computer-readable medium in order to control an electronic camera provided with an imager, having an imaging surface irradiated with an optical image that undergoes an optical lens, which outputs an electronic image corresponding to the optical image, said computer program causes a processor of said electronic camera to perform the following steps:
   a predicting step of predicting a focus direction based on distance information registered in a storage when receiving a focus adjustment operation from an operator;
   an adjusting step of adjusting the distance from said optical lens to said imaging surface to a distance corresponding to a focal point, based on the electronic image outputted from said imager and a prediction result of said predicting step; and
   a registering step of registering distance information indicating the distance adjusted by said adjusting step into said storage, wherein said adjusting step includes a resetting step of determining an adequacy of the prediction result based on the electronic image so as to reset a change direction.

10. A focus control method executed by an electronic camera provided with an imager, having an imaging surface irradiated with an optical image that undergoes an optical lens, which outputs an electronic image corresponding to the optical image, said focus control method comprising:
   a predicting step of predicting a focus direction based on distance information registered in a storage when receiving a focus adjustment operation from an operator;
   an adjusting step of adjusting the distance from said optical lens to said imaging surface to a distance corresponding to a focal point, based on the electronic image outputted from said imager and a prediction result of said predicting step; and
   a registering step of registering distance information indicating the distance adjusted by said adjusting step into said storage, wherein said adjusting step includes a resetting step of determining an adequacy of the prediction result based on the electronic image so as to reset a change direction.

* * * * *